Patented Apr. 15, 1947

2,419,185

UNITED STATES PATENT OFFICE 2,419,185

POLYMERIZATION OF ROSIN

Clinton A. Braidwood, Ferndale, Mich., and Almon G. Hovey, Minneapolis, Minn., assignors to Reichhold Chemicals, Inc., Detroit, Mich.

No Drawing. Application June 20, 1945, Serial No. 600,642

13 Claims. (Cl. 260—97)

The invention relates to the polymerization of rosin by the use of fluosulfonic acid ($HOSO_2F$). Rosin has been polymerized by many methods, including the use of sulfuric acid, zinc chloride, aluminum chloride, and the like as catalysts. Rosin has also been polymerized by the use of $BF_3$ and $HBF_4$ as catalysts and by the use of sulfuric acid in the presence of fluorobenzene and fluorotoluene.

Insofar as I am aware the polymerization of rosin by the use of fluosulfonic acid, however, is novel, and I have found that by its use unexpectedly favorable results are obtained insofar as ease of process and high melting point and good color of the product are concerned. It is even possible to take commercial polymerized rosins which are on the market and put them through our process and raise the melting point several degrees centigrade, showing that this reaction is very complete when using the methods as described in this specification.

Among the advantages of this process are:

1. Maintenance of light color while obtaining high melting point.
2. Economy in heating. No heat is required while polymerizing.
3. The process is applicable to virgin rosin or sap directly obtained from the trees, and rosin extracted from stumps.
4. The reaction is very complete as may be seen from comparison of the melting range as set forth in the accompanying examples with those of commercial products.
5. The catalyst may be easily removed, recovered, and used again. The recovered catalyst does not have to be treated since the process is anhydrous throughout.
6. This process may be used with stainless steel equipment in which light colored products may be obtained with no appreciable amount of corrosion. This makes it very advantageous since regular processing kettles of standard manufacture may be used.
7. Fluosulfonic acid is not an oxidation catalyst by inherent characteristics, whereas sulfuric acid, in addition to being a polymerizing agent, is also at the same time a strong oxidation agent. With fluosulfonic acid, therefore, undesirable products of side reactions are minimized.
8. The present process, using fluosulfonic acid, is much more advantageous than those using $BF_3$, because $BF_3$ requires a coupling agent, such as ethers, alcohols, etc., to render it sufficiently less volatile that it can remain in the reaction mixture to perform the function of catalysis. As compared with fluoboric acid ($HBF_4$), which has also been proposed for use as a catalyst for rosin, fluosulfonic acid ($HOSO_2F$) is obtainable in commercial quantities at a cost of six to seven cents per pound, whereas fluoboric acid ($HBF_4$) is not at present available commercially, is very difficult to package and handle, and is very expensive.

9. Many of the shortcomings of sulfuric acid and of zinc chloride are eliminated, particularly the evils of dehydrating to charred materials if the reaction mixture becomes too hot and the catalysts too concentrated.

According to our preferred process, rosin is first dissolved in a suitable solvent and agitation employed, after which the catalyst is added slowly in order to maintain the batch at about room temperature. The next step comprises separating the upper polymer solution which is formed in the process from the acid sludge by either drawing off the lower sludge from the polymer solution or decanting the upper polymer layer from the sludge. The polymer solution is then washed and the solvent removed from the rosin polymer solution under inert atmosphere (nitrogen or carbon dioxide) and a polymerized rosin is recovered which has a melting point higher than the original rosin and color nearly equal to and in some cases better than the original rosin. The solvent is saved for repeated use in the system. The acid sludge is reused in the next batch of rosin solution with the addition of a small percent of fluosulfonic acid to replace that remaining in the upper layer. The steps are then repeated. The process may be diagrammatically illustrated as follows:

METHOD FOR POLYMERIZING ROSIN

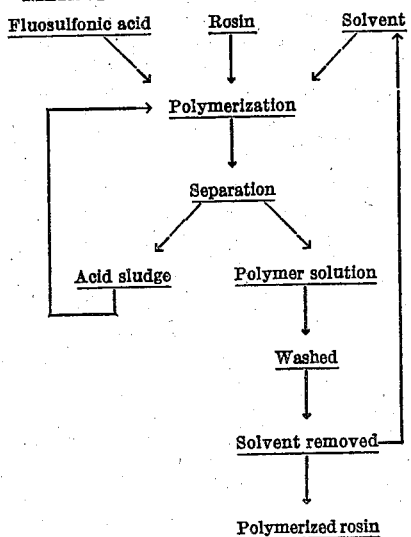

The acid sludge referred to above is a complex or molecular association product of polymerized rosin and fluosulfonic acid, and can be treated in several ways such as the following:

1. The sludge layer still remains as an efficient catalyst and can be used over again to polymerize rosin. This catalytic sludge can be added with agitation to a rosin solution or a rosin solution can be added to the acid sludge, adding only a small percent of fresh fluosulfonic acid to compensate for the loss of the catalyst in the upper layer. The addition of this small amount of fluosulfonic acid is desirable to maintain a uniform product. The reaction vessel can be so designed that while a rosin solution is being contacted with the acid sludge plus small percent of fresh fluosulfonic acid, either the acid sludge or the polymer rosin solution after any desirable contact period can be taken off continuously. By utilizing the acid sludge in this manner a continuous process for polymerizing rosin can be easily developed.

2. The molecular association compound of polymerized rosin and fluosulfonic acid (sludge) can be treated with a dilute acid or alkali and temperature to hydrolyze this acid complex. A highly polymerized rosin is recovered which is dark in color and has a very high melting point.

3. The acid complex of fluosulfonic acid and polymerized rosin can be distilled, keeping the temperature below 90° C., under vacuum to take off fluosulfonic acid and leave a dark highly polymerized and high melting point rosin similar to the above (No. 2).

4. The acid sludge in the reactant mixture, i. e. before decanting upper polymer solution can be treated with a dilute acid or alkali and temperature to decompose the complex or molecular association product of fluosulfonic acid and polymerized rosin, thus an additional amount of highly polymerized rosin is returned to the solution of polymer. If this solution is not treated with fuller's earth, activated clay, etc. to remove color bodies, the resultant product will be darker in color than the original rosin.

However, we do not propose to use this technique in commercial practice but will decant the solution of polymer from the sludge, then wash and remove the solvent under inert atmosphere to obtain our final product, the sludge being used over again as previously explained.

The process can be employed as a batch method where the catalyst is recovered by distillation of the acid sludge or be employed as a continuous process, that is, the acid sludge is added to a rosin solution or a rosin solution is added to the acid sludge under suitable conditions. (See Examples III and IV.)

The invention in its broadest aspects is not dependent on the use of specific types or proportions of rosin or solvent, specific proportions of catalyst, or on specific temperature or time limitations. By way of illustration, however, the effect of these factors will be briefly discussed.

1. *Proportions of catalyst*

We have found that any amount of fluosulfonic acid from 0.1% to 100% based on the solid rosin will increase the melting point, but for practical operation and economical reasons it is preferred to use from 2% to 50% catalyst, which will produce a rise of about 10° to 65° C. capillary melting point method. Concentrations of catalyst above 50% based on the weight of rosin effect an increase in melting point of about 50° to 90° C. (capillary tube). The use of such high concentrations of catalyst, however, results in yield decreases. For practical purposes concentrations of catalyst of between 2% and 50% are advisable to obtain a good color, high melting point and high yields.

A 100% catalyst concentration, that is, equal parts fluosulfonic acid and rosin solids, will give a melting point of about 140° C. (capillary tube), which is a rise of 90° over the original rosin.

2. *Temperature ranges*

As to temperature ranges, the practical upper limit is ordinarily about 90° C. because that is the temperature at which fluosulfonic acid begins to dissociate at atmospheric pressure. High temperatures may be used in expensive high pressure equipment.

The practical lower temperature limit is controlled by the solubility characteristics of the rosin in solvents at low temperatures and the freezing point of fluosulfonic acid, which is −87.3° C. However, as the reaction proceeds efficiently at atmospheric pressure and at usual atmospheric temperatures ranging from −18° C. to +38° C. mechanically produced temperatures and pressures greater or less than normal atmospheric would be uneconomical, although within the scope of the invention.

3. *Types of solvents*

Numerous types of solvents may be used in accordance with the present process. Among these are aromatic hydrocarbons such as benzene, toluene, xylene, etc.; aliphatic solvents such as petroleum ether, gasoline, V. M. P. naphtha, normal hexane, heptane, octane, etc.; saturated cyclic compounds such as cyclohexane, methyl cyclohexane, etc., and hydrogenated naphthas. Chlorinated solvents may also be used, such as carbon tetrachloride, ethylene dichloride and trichloride, dichlorobutane and chlorobenzene. The solubility of rosin in the above listed solvents varies and therefore the concentration of rosin in solvent ranges from about 10% to 75%. The practical concentration is from about 20% to 50%, but the invention is not limited to this range.

4. *Rosins treated*

The rosins treated in accordance with the present invention may be of any of the known types, such as any grade of French or American gum rosins or wood rosin. The rosins employed may have been previously purified by any of the many known methods of purifying rosin, such as solvent extraction, or with the aid of activated carbon, fuller's earth, etc.

The invention will be more readily understood by reference to the following examples, in which are set forth by way of illustration specific embodiments of the inventive thought, but it will be understood that the invention is not limited to the details of said specific examples:

EXAMPLE I

To a solution of 400 g. of N gum rosin in 400 gms. of V. M. P. naphtha was slowly added 40 g. of fluosulfonic acid with agitation at temperatures between 25°–30° C. The reaction was exothermic and the solution turned dark brown. Thirty minutes after the fluosulfonic acid was added, the agitation was stopped, allowing about 15 minutes for the catalyst to settle to the bottom of the reaction vessel. The upper layer containing the polymerized rosin solution was removed and washed with water to remove traces of catalyst. The solvent from the polymerized rosin solution was then removed from the polymerized rosin by distillation under inert atmosphere.

The original gum rosin and the product after treatment has the following characteristics:

|  | Original Gum Rosin | Polymerized Gum Rosin |
|---|---|---|
| Color | N | N |
| Melting Point (capillary M. P. Method), °C | 69 | 94 |
| Acid No | 168 | 158 |

EXAMPLE II

Four hundred grams of K wood rosin were dissolved in 813 g. of xylol. This solution was cooled to 14° C. at which time 40 g. of fluosulfonic acid was gradually added with agitation over a period of 27 minutes so as to maintain the temperature between 15° to 18° C. Agitation was maintained for one hour after the addition of the fluosulfonic acid, at which time agitation was stopped and the reactant solution was allowed to stand 30 minutes to allow the catalyst to settle. The upper layer was removed, washed, and the solvent removed from the polymerized rosin by distillation under inert atmosphere. Better than 90% polymerized rosin was recovered. The recovered product and the original wood rosin had the following characteristics:

|  | Original Wood Rosin | Polymerized Wood Rosin |
|---|---|---|
| Color | K | M |
| Melting Point (Capillary M. P. Method), °C | 57 | 84 |
| Acid No | 168 | 161 |
| Saponification No | 176 | 175 |
| Unsaponifiable, Per Cent | 8 | 5 |

EXAMPLE III

To a solution of 400 grams of K wood rosin in 800 grams of xylol was gradually added 80 grams of fluosulfonic acid during agitation between the temperatures of 15° to 25° C. After the addition of the catalyst the solution was agitated for 30 minutes, at which time agitation was stopped to allow the fluosulfonic acid to settle to the bottom of the reaction vessel. The upper layer of the reaction mixture containing polymerized rosin and solvent was removed, washed, dried, and the solvent removed under inert atmosphere. The recovered polymerized rosin and original wood rosin had the following characteristics:

|  | Original Wood Rosin | Polymerized Wood Rosin |
|---|---|---|
| Color | K | M |
| Melting Point (Capillary M. P. Method), °C | 57 | 95 |
| Acid No | 168 | 150 |
| Saponification No | 176 | 167 |
| Unsaponifiable, Per Cent | 8 | 7 |

EXAMPLE IV

Four hundred grams of K wood rosin in 800 grams of xylol was added to the acid sludge in Example III. The addition of the rosin solution was made during agitation and temperatures from 15° to 25° C. The reactant mixture was agitated for 1½ hours, at which time agitation was stopped to allow acid sludge to settle to the bottom of the reactant vessel. The upper layer containing the polymerized rosin solution was removed, washed, dried, and the solvent removed under inert atmosphere. The recovered polymerized wood rosin and original wood rosin had the following characteristics:

|  | Original Wood Rosin | Polymerized Wood Rosin |
|---|---|---|
| Color | K | K+ |
| Melting Point (Capillary M. P. Method), °C | 57 | 80 |
| Acid No | 168 | 153 |
| Saponification No | 176 | 166 |
| Unsaponifiable, Per Cent | 8 | 7 |

This example demonstrates that the acid sludge is an effective catalyst and that a continuous process may be employed, the rosin solution being added to the acid sludge or the acid sludge being added to a rosin solution continuously. A small percent of fluosulfonic acid may be added to the reaction unit continuously to make up for small losses and to give a uniform product.

EXAMPLE V

To a solution of 300 grams of N wood rosin in 400 grams of xylol was added 8 grams of fluosulfonic acid slowly with stirring at room temperature. The fluosulfonic acid was all added to the rosin solution in 10 minutes. The reaction solution turned dark brown and a rise in temperature was noted. Agitation was continued in the reactant solution for 30 minutes, at which time agitation was stopped. The reaction solution was allowed to stand 15 minutes to allow the catalyst to settle to the bottom of the reaction vessel, at which time the top layer containing the polymerized rosin solution was decanted from the sludge, washed, dried and solvent removed. The yield of the polymerized rosin was about 94%. The polymerized product and the original rosin had the following characteristics:

|  | Original Wood Rosin | Polymerized Wood Rosin |
|---|---|---|
| Color | N | N-WG |
| Melting Point (Capillary M. P. Method), °C | 56 | 70 |
| Acid No | 167 | 161 |

EXAMPLE VI

Three hundred grams of FF rosin were dissolved in 900 grams of benzene. The solution was cooled to 18° C. at which time 60 grams of fluosulfonic acid was gradually added with agitation over a 30 minute period. The temperature was maintained between 18°–30° C. Agitation was continued for three hours, at which time it was stopped. Thirty minutes standing was given for the catalyst to settle to the bottom of the reaction vessel. The upper layer containing the polymerized rosin was decanted from the sludge, washed and benzene recovered from the polymerized rosin by distillation under inert atmosphere. The original wood rosin and the polymerized product had the following characteristics:

|  | Original Wood Rosin | Polymerized Wood Rosin |
|---|---|---|
| Color | FF | G-H |
| Melting Point (Capillary M. P. Method), °C | 49 | 103 |
| Acid No | 152 | 139 |

EXAMPLE VII 200 g. of N-gum rosin were dissolved in 400 g. of V. M. P. naphtha, which had been previously dried in the presence of anhydrous sodium sulfate. The 33⅓ percent solution of the N-gum rosin in V. M. P. naphtha was placed in a 3-necked, round bottom flask which was equipped with a reflux condenser, drying tubes, mercury seal, agitator and a dropping funnel to secure slow and steady addition of catalyst. The dropping funnel is also equipped with a drying tube.

The rosin solution was cooled to −10° C. and then 20 grams of fluorsulfonic acid was added drop-wise, under vigorous agitation to prevent non-uniformity of the reaction mixture. Catalyst was added drop by drop over a period of 1¼ hours, keeping the temperature at −10° C.±8°. When the catalyst had all been added, agitation was continued for a period of 4¾ hours. There is sufficient latitude here that the reaction mixture may be allowed to stand overnight if necessary.

At this point if the agitation is stopped, a two phase system appears. The upper layer would contain a solution of about 90 percent polymerized rosin which is relatively free from catalyst, and the lower sludge layer would contain a complex or molecular association product of fluosolfonic acid and the balance of the polymerized rosin. The upper layer containing the polymerized rosin can be decanted from the lower sludge layer, washed with water until all traces of catalyst are removed, and then the solvent removed under inert atmosphere which would give a polymerized rosin of high melting point, and of color nearly equal to and in some cases better than the original rosin.

However, instead of decanting the upper polymer layer from the acid sludge there was added 40 grams of sodium carbonate in 40 grams of water to the whole reaction mixture and during agitation was heated at 80° C. for 4 hours. Most of the acid sludge was decomposed, thus liberating a polymerized rosin which to this point was in the form of a complex fluosulfonic acid sludge and which after liberation gave an additional amount of polymerized rosin to the solution of polymer. The polymer solution was then washed with water until neutral to litmus paper, dried, and solvent removed by distillation under vacuum. When the last drop of V. M. P. naphtha was removed, the temperature was increased to 190° C. under 25 mm. vacuum and held there for 30 minutes. The polymerized rosin prepared by the foregoing procedure had the following properties:

Color _____ D-E
Acid No_____ 157.8
Melting point (Cap. M. P. method) °C__ 92–93

This compares with the properties of the untreated N-gum rosin as starting material:

Color _____ N
Acid No_____ 168.8
Melting point (Cap. M. P. method) °C____ 69–71

As a matter of further comparison to show that the increase in melting point of the treated rosin was due solely to fluosulfonic acid and not due to the distillation of volatile material from the rosin itself, and also that rosin cannot be heated without darkening unless proper precautions are made to minimize this effect, the following experiment was run:

200 grams of N-gum rosin were dissolved in 400 g. of V. M. P. naphtha (no catalyst was added) and then the V. M. P. naphtha was removed from the rosin under the same conditions, time, temperature and pressure as were used to remove the solvent from the polymerized rosin. The recovered rosin had the following characteristics:

Color _____ G-H
Acid No_____ 167.5
Melting point (Cap. M. P. method) °C____ 67–69

From the above data it is clearly shown that the increase in melting point of the rosin treated with fluosulfonic acid is due to polymerization effected by the fluosulfonic acid and not by distillation of volatiles from the rosin. Had inert gas such as nitrogen or carbon dioxide been used throughout this example (VII), the color of the final product would have been nearly as light as the original rosin as will be shown in the following example where inert gas is used.

EXAMPLE VIII 762 g. of N-gum rosin was dissolved in 762 of V. M. P. naphtha, the solvent having been previously dried in the presence of anhydrous sodium sulfate. The 50% solution of N-gum rosin was then placed in a 3-liter flask equipped with mercury seal, agitator, reflux condenser, drying tubes (calcium chloride) and dropping funnel as in Example VII. To this solution there was added 70 g. of fluosulfonic acid at such a rate as to maintain the temperature at about 25° C. The addition of the fluosulfonic acid was accomplished in 43 minutes. After the addition of the catalyst agitation and temperature at about 25° C. was maintained for 19 hours. At the end of this time the upper layer of polymer solution was decanted from the acid sludge into 1000 ml. of water. The solution was then washed again with water, then once with a 2% solution of sodium carbonate for neutralization, and then once more with water.

The polymer solution of rosin was then dried, and solvent removed from the polymerized rosin under inert atmosphere. No vacuum was used in this example. The use of the inert gas improved the color as previously pointed out. The N-gum rosin used in this example was the same as that described in Example VII. The result of this experiment is as follows:

Color _____ M–N
Acid No_____ 158
Melting point (Cap. M. P. method) °C____ 93–94

The melting range, according to the ball and ring method, A. S. T. M., is 113°–114° C., this figure also being reported because the values of the ball and ring method are always so much higher than that of the true melting range as determined by the capillary melting point method that confusion might otherwise result unless both are reported. The ball and ring softening point of some commercial polymerized rosins now on the market is 92°–94° C., which is only 77°–79° C. by capillary melting point determination.

The present application is a continuation in part of application Serial No. 548,496, filed August 7, 1944, entitled Polymerization of rosin.

We claim:

1. A process which comprises polymerizing rosin with the aid of fluosulfonic acid as a catalyst.

2. A process of polymerizing rosin which includes the step of adding fluosulfonic acid to the rosin to assist in the polymerization.

3. A process as set forth in claim 2 wherein the amount of catalyst employed is from 2 to 50% by weight of the solid rosin employed.

4. A process of polymerizing rosin which comprises adding fluosulfonic acid to a solution of rosin in a volatile solvent, and subsequently heating the solution until the solvent is removed.

5. A process as set forth in claim 3 wherein the temperature is maintained within the range of —87.3° C. to +90° C.

6. A process as set forth in claim 3 wherein the solvent is a volatile aromatic hydrocarbon.

7. A process of polymerizing rosin which comprises adding fluosulfonic acid to a naphtha solution of rosin, and subsequently heating the solution until the solvent is driven off.

8. A process as set forth in claim 3 wherein an aliphatic solvent is employed.

9. A process as set forth in claim 3 wherein the solvent is a saturated cyclic compound.

10. A process as set forth in claim 3 wherein a chlorinated organic solvent is employed.

11. A process of polymerizing rosin which comprises dissolving rosin in a volatile solvent, slowly adding a catalyst comprising fluosulfonic acid to the solution, accompanied by agitation, discontinuing the agitation and allowing the mass to separate into two layers, separating the upper from the lower layer, and removing the solvent from the upper layer by distillation in an inert atmosphere whereby a polymerized rosin is obtained having a light color and a melting point higher than that of the original rosin.

12. A process of polymerizing rosin which comprises mixing a solution of rosin in a volatile organic solvent with a catalyst comprising fluosulfonic acid, allowing the mass to separate into two layers, separating the upper layer containing polymerized rosin in solution from the lower layer of sludge containing the catalyst, and removing the solvent by distillation from the upper layer under inert atmosphere whereby a polymerized rosin is obtained characterized by light color and a higher melting point than the original rosin.

13. A process as set forth in claim 5 wherein the lower layer is employed as a catalyst for the treatment of additional rosin.

CLINTON A. BRAIDWOOD.
ALMON G. HOVEY.

REFERENCES CITED

The following references are of record in the file of this patent:

UNITED STATES PATENTS

| Number | Name | Date |
|---|---|---|
| 2,302,576 | Rummelsburg | Nov. 17, 1942 |